May 1, 1945.  J. B. MURRAY  2,374,695
FILE FOLDER
Filed May 17, 1944
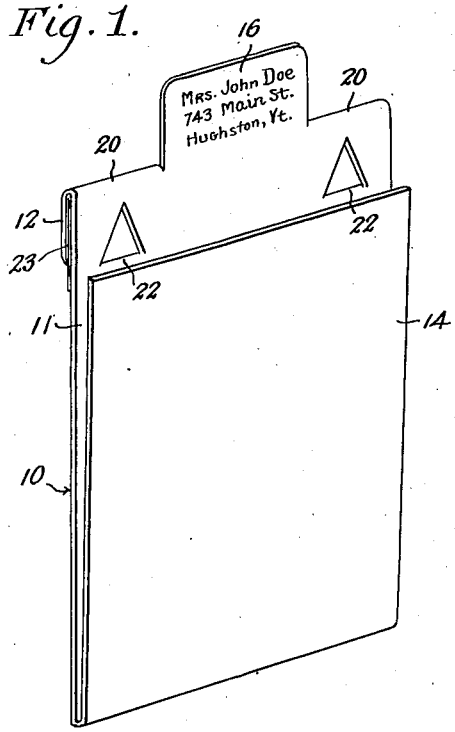
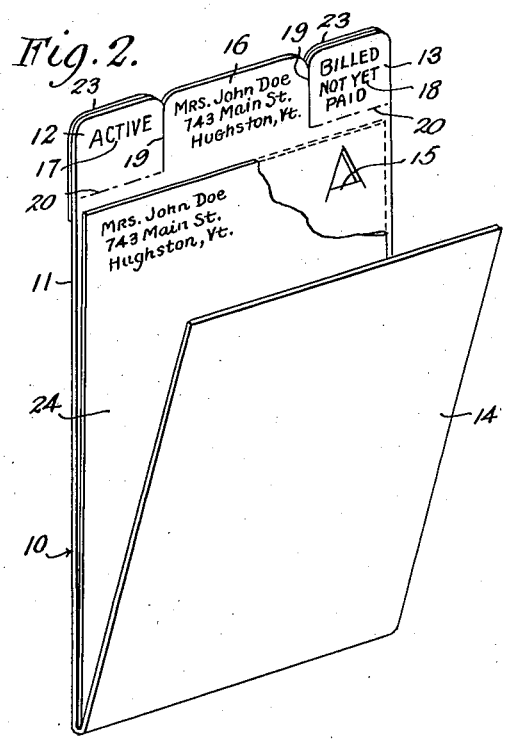
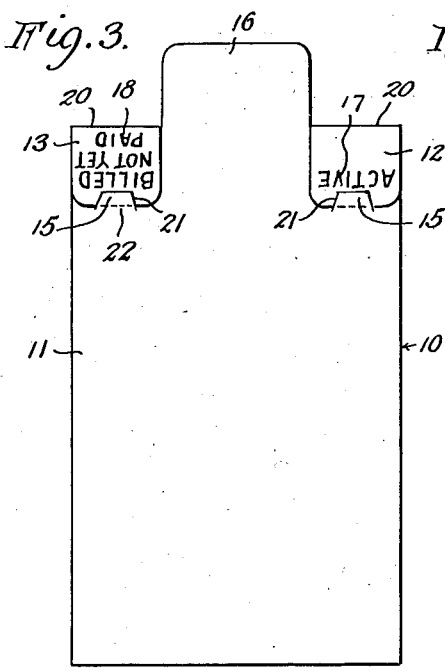
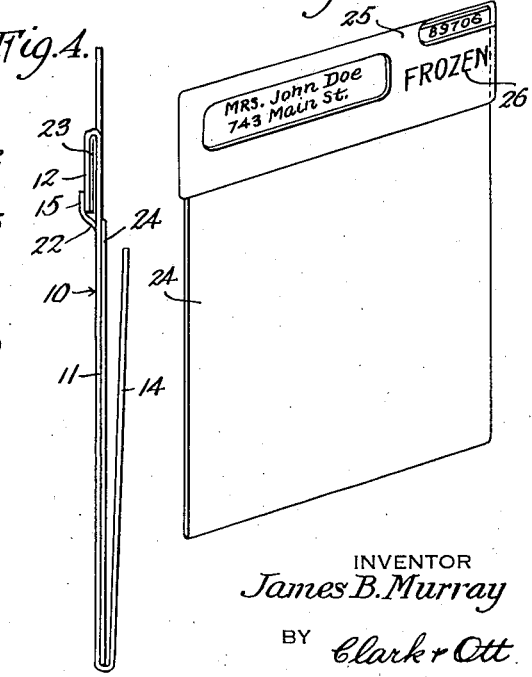
INVENTOR
James B. Murray
BY Clark & Ott
ATTORNEYS Patented May 1, 1945

2,374,695

UNITED STATES PATENT OFFICE 2,374,695

FILE FOLDER

James B. Murray, Garden City, N. Y.

Application May 17, 1944, Serial No. 535,932

4 Claims. (Cl. 129—16.8)

This invention relates to file folders and the same has particular reference to an improved file folder for containing the records of a customer's account and for indicating the status thereof, the same being primarily adapted for use by business concerns having a large number of accounts.

The principal object of the invention is the provision of an improved file folder for receiving during each billing period the current sales tickets of a customer and an individual ledger card on which is recorded the balance of the account at the end of the billing period at which time a statement of the account is prepared and forwarded to the customer together with the sales tickets accumulated during the period, the file folder being provided with means bearing indicia for indicating the status of the account and which means is normally disposed in concealed relation and is adapted to be moved into display position in accordance with changes in the status of the account.

The invention further comprehends a file folder of the indicated character having tabs bearing said indicia which tabs are foldably connected with said folder for disposing the same in concealed relation when the account is inactive and for moving the same into display position when the status of the account changes.

With the foregoing and other objects in view, reference is now made to the following specification and accompanying drawing in which is illustrated the preferred embodiment of the invention.

In the drawing:

Fig. 1 is a perspective view of a file folder constructed in accordance with the invention and illustrating the indicia bearing tabs disposed in concealed relation.

Fig. 2 is a similar view illustrating the folder containing a record of the account and the tabs moved to display position.

Fig. 3 is a rear view of the file folder.

Fig. 4 is side view thereof.

Fig. 5 is a face view of a ledger card for recording thereon the balance of the account and illustrating the same with means thereon indicating that the account is frozen.

Referring to the drawing by characters of reference, the file folder 10 which is adapted to contain the records of a customer's account, is so constructed that a visual indication of the status of the account is apparent upon an inspection of the file folder. For this purpose the rear leaf 11 of the folder is provided with a plurality of laterally spaced tabs 12 and 13 which are hingedly connected therewith to project upwardly therefrom so as to be disposed in upstanding relation above the front leaf 14 where they will be readily visible when viewed from the front of the usual drawer or cabinet in which the folders are contained.

The tabs 12 and 13 are each swingable from said upstanding position to a depending relation at the rear of said rear leaf 11 and into engagement with a locking tongue 15 carried thereby for releasably securing the tabs respectively in an out of the way concealed position between said tongue and the rear face of the leaf 11.

In order that the folders may be quickly identified and the status of the accounts readily apparent upon an inspection of the folders so as to facilitate the filing of the records of the accounts and in order to determine the action to be taken with reference thereto, the forward faces of the rear leaves of the folders are provided with the names and addresses of the customers respectively which are preferably located adjacent the top thereof and between the tabs 12 and 13 as indicated at 16 where the same are visible from the front of the folder. The tabs 12 and 13 are provided on the forward faces thereof with indicia relative to phases of the account such as the word "Active" and the phrase "Billed not yet paid" as indicated at 17 and 18 respectively which are visible from the front of the drawer or cabinet in which the folders are contained when the tabs are disposed in upstanding relation.

The folders 10 are adapted to provide a separate repository for the records of the customers' accounts respectively during each billing period such as sales tickets, credit memoranda and ledger card. At the beginning of the billing period, the tabs 12 and 13 are swung downwardly and secured in concealed relation by the tongues 15 so that the only visible indicia on the folders are the names and addresses of the customers. This provides means by which the folders may be readily identified for filing therein the sales tickets which is done daily as the purchases are made by the customers. Coincident with the filing of first sales tickets of a customer during a billing period, the tab bearing the indicia "Active" on the customer's folder is released from engagement with the tongue 15 and is swung into upstanding relation where it presents a visual indication during the remainder of the billing period that the account is active and that a statement of the account must be prepared and forwarded to the customer at the end of the billing period. When such time arrives which is usually once a month, the records of each account are removed from its folder and a statement of the account prepared from the sales tickets and the balance of the account recorded on the ledger card. This card is returned to the file folder while the statement and sales tickets are forwarded to the customer which fact is indicated on the folder by disposing the tab 13 in upstanding relation so that the words "Billed not yet paid" becomes visible.

The folder 10 is preferably fashioned from a length of cardboard or other equivalent material which is bent upon itself to form the rear and front leaves 11 and 14 which are hingedly connected together along their bottom edges so that the upper portions of the leaves may be spread apart for receiving and storing the records of an account. Preferably the tabs 12 and 13 are formed integrally with the rear leaf 11 by slitting the same inwardly from the upper edge thereof as at 19 and by scoring or creasing the blank from the inner ends of the slits 19 to the adjacent side edges thereof forming the fold lines 20 on which the tabs are folded into depending relation at the rear of the leaf 11 and swung into upstanding position. The tongues 15 are also preferably formed integrally with the rear leaf 11 and which as illustrated are cut from said leaf on the upwardly converging lines 21 and are offset rearwardly on the lines 22 to extend upwardly and into position to be flexed outwardly for receiving the tabs between the same and the rear leaf 11.

The tabs 12 and 13 are each preferably provided with a flexible resilient strip 23 which is secured to the rear thereof and to the rear leaf adjacent the fold line 20 so as to cover and reinforce the fold line and functions to flex the tab upwardly when released from engagement with the tongue 15. The strip 23 may consist of any desired material which will function as desired such as rubberized material, woven fabric, elastic or adhesive tape and the same may also be transparent and overlie the forward face of the tabs and cover and reinforce the forward face of the fold line 20.

The ledger card 24 which is illustrated in Figures 2, 4 and 5 of the drawing may also bear the name and address of the customer and the customer's file or account number as indicated. In order to comply with requirements prohibiting selling to customers whose accounts are unpaid after the stated period following the mailing of the statements, a sheath 25 is provided which is adapted to engage over the upper end of the ledger card and which is provided with indicia such as the word "Frozen" as indicated at 26 for indicating that the account has not been paid and that no further purchases may be made by the customer until the account is paid. The sheath 25 is applied to the ledger card 24 if the account remains unpaid at the end of the period following the mailing of the statement and the same is not removed until payment is made. The sheath is formed with openings through which the name and address of the customer and the customer's account number are visible.

What is claimed is:

1. A file folder for containing records of a customer's account comprising front and rear leaves connected together along their bottom edges and a tab hingedly connected with the rear leaf for movement of said tab from depending concealed relation at the rear of said leaf to upstanding display position extending above said rear leaf, said tab bearing indicia for indicating the status of the account when the tab is disposed in upstanding position and means for detachably securing the tab in depending relation at the rear of said rear leaf.

2. A file folder for containing records of a customer's account comprising a rear leaf, a front leaf of lesser height than said rear leaf and connected to said rear leaf along its bottom edge and a plurality of laterally spaced tabs integrally and hingedly connected with the rear leaf for movement of said tabs from depending concealed relation at the rear of said leaf to upstanding display position extending above said rear leaf, said tabs bearing indicia for indicating the relative status of the account when the tabs are disposed in upstanding position respectively and means integral with the rear leaf for detachably securing the tabs in depending concealed relation at the rear of said rear leaf.

3. A file folder for containing records of a customer's account comprising a rear leaf, a front leaf of lesser height than said rear leaf and connected to said rear leaf along its bottom edge and a plurality of laterally spaced tabs integrally and hingedly connected with the rear leaf along the upper edge thereof for movement of said tabs from depending concealed relation at the rear of said leaf to upstanding display position extending above the upper edge of said rear leaf, said tabs bearing indicia for indicating the relative status of the account when the tabs are disposed in upstanding position and means formed from said rear leaf and disposed below the upper edge thereof for detachably securing the tabs in depending concealed relation at the rear of said rear leaf.

4. A file folder for containing records of a customer's account comprising front and rear leaves hingedly connected together to permit the insertion of records therebetween, a tab hingedly connected with the rear leaf for movement of said tab from a depending position to an upstanding position projecting above the front leaf, said tab bearing indicia for indicating the status of the account when the tab is disposed in upstanding position, means for detachably securing the tab in depending position and a flexible resilient strip secured to said tab and folder in covering relation with the hinged connection therebetween for flexing the tab upwardly when the same is released from depending position.

JAMES B. MURRAY.